(12) United States Patent    (10) Patent No.:     US 8,526,489 B2
Narasimhan et al.            (45) Date of Patent:     Sep. 3, 2013

(54) PERSONAL VIDEO RECORDER

(75) Inventors: Mandayam Narasimhan, San Diego, CA (US); Robert O. Eifrig, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 985 days.

(21) Appl. No.: 12/183,055

(22) Filed: Jul. 30, 2008

(65) Prior Publication Data

US 2009/0074053 A1    Mar. 19, 2009

Related U.S. Application Data

(60) Provisional application No. 60/972,295, filed on Sep. 14, 2007.

(51) Int. Cl.
*H04N 7/12* (2006.01)

(52) U.S. Cl.
USPC ..................... 375/240.01; 382/239

(58) Field of Classification Search
None
See application file for complete search history.

(56) References Cited

U.S. PATENT DOCUMENTS

2004/0258318 A1* 12/2004 Yu et al. ............... 382/239
2007/0121723 A1* 5/2007 Mathew et al. ........ 375/240.12
2009/0074053 A1* 3/2009 Narasimhan et al. ... 375/240.01

* cited by examiner

*Primary Examiner* — Andrew Lai
*Assistant Examiner* — Leon Andrews
(74) *Attorney, Agent, or Firm* — Lori Anne D. Swanson

(57) ABSTRACT

A sequence of picture slices is encoded as reference slices and non-reference slices, wherein the reference slices include B slices, by forming, for each B slice, at least one data packet containing data values derived from brightness and color information pertaining to the slice. The data packet for each B slice includes a header element indicating whether the B slice is a reference slice. The header element of each reference B slice has a value that depends on depth of the reference B slice in a hierarchy of discardability.

19 Claims, 3 Drawing Sheets

PERSONAL VIDEO RECORDER

CROSS-REFERENCE TO RELATED APPLICATION

This application claims benefit of U.S. Provisional Application No. 60/972,295 filed Sep. 14, 2007, the entire disclosure of which is hereby incorporated herein by reference for all purposes.

BACKGROUND OF THE INVENTION

The subject matter disclosed in this application relates to a personal video recorder and, in particular, to a method and apparatus for improving trick playback operation of a personal video recorder.

A television programming provider typically produces a continuous set of programming signals (also known as "network feeds") for distribution by a service provider over a video transmission network to a wide audience of viewers. Conventionally, the programming signal begins as an uncompressed video sequence and at least one corresponding uncompressed audio sequence. The uncompressed video sequence consists of a series of sequential pictures and is assembled at a production facility. After assembly, the uncompressed video sequence is compressed by a video encoder, which encodes each picture and creates a corresponding coded picture (also known as an access unit). Any corresponding audio sequences are compressed by an audio encoder. The coded audio and video sequences are transmitted over the transmission network to customer premises at which the audio and video sequences for a selected program are decoded and presented to the viewer.

ISO/IEC 14496-10 (MPEG-4 part 10) Advanced Video Coding (AVC), commonly referred to as H.264/AVC, prescribes a standard for coding image data for transmission and storage. H.264/AVC defines a frame as containing an array of luma samples and two corresponding arrays of chroma samples and as being composed of two fields, a top field and a bottom field. A 16×16 block of luma samples and two corresponding blocks of chroma samples is referred to as a macroblock. A picture (a generic term for a field or a frame) is partitioned into slice groups and each slice group contains one or more slices, each of which in turn contains an integer number of macroblocks.

H.264/AVC defines an I slice, a P slice and a B slice. Each slice is encoded as blocks of transform coefficients. The definition of an I slice in H.264/AVC is generally accepted as meaning a slice that is decoded using prediction only from decoded samples within the same slice, i.e. an I slice is self-contained. Similarly, under H.264/AVC, a P slice is a slice that may be decoded using prediction from decoded samples within the same slice or from decoded samples of at most one previously decoded reference picture using at most one motion vector and reference index to predict the sample values of each block. Thus, each block of transform coefficients in a P slice relies on only one previously decoded reference picture. And under the generally accepted interpretation of H.264/AVC, a B slice is a slice that may be decoded using prediction from decoded samples within the same slice or from decoded samples of at least one reference picture using at most two motion vectors and reference indices to predict the samples of each block. Thus, each block of transform coefficients in a B slice may rely on two reference pictures. Although any block of a P slice relies on only one reference picture, different blocks in a given P slice may rely on different reference pictures. Similarly, although any block of a B slice may rely on only two reference pictures, different blocks in a given B slice may rely on different reference pictures. Each slice has a slice header containing a slice_type syntax element, indicating whether the slice is an I slice, a P slice or a B slice, and a reference picture list indicating the pictures, if any, on which the slice relies for decoding.

A picture that contains only I slices may be referred to as an I picture. Similarly, a picture that contains only I slices and P slices may be referred to as a P picture and a picture that contains one or more B slices may be referred to as a B picture. H.264/AVC allows I, P and B pictures to be used as reference pictures.

The image information in each picture is represented by data contained in one or more Network Abstraction Layer (NAL) units. There are two types of NAL units, namely Video Coding Layer (VCL) NAL units and non-VCL NAL units. The subject matter of this application relates to the VCL NAL units and accordingly subsequent references to NAL units should be interpreted as referring to VCL NAL units. A NAL unit is a packet having an integer number of bytes and contains the image information for one slice. The first byte of a NAL unit is a header that contains a two-bit syntax element nal_ref_idc. H.264/AVC specifies that nal_ref_idc is zero for a slice that is part of a non-reference picture and is not equal to zero for a slice of a reference picture, and that when nal_ref_idc is equal to zero for one slice of a particular picture, it shall be equal to zero for all slices of that picture. Thus, for any given picture, the nal_ref_idc values for all the slices are zero or all are non-zero. Accordingly, it is meaningful to refer to a picture for which nal_ref_idc=0 and to a picture for which nal_ref_idc≠0. Although H.264/AVC does not use the terms "reference slice" and "non-reference slice," it is convenient to use these terms to refer, respectively, to a slice for which nal_ref_idc≠0 and a B slice for which nal_ref_idc=0.

An AVC encoder receives an input frame for encoding and generates a bitstream representing, for each slice, the slice header and a set of transform coefficients. The mode of operation of a suitable AVC encoder is well understood by those skilled in the art. The bitstream generated by the AVC encoder is passed to a network abstraction layer, which forms the NAL units with the required syntax elements (including the nal_ref_idc bits) at the proper location (NAL header) in the NAL units.

Signals encoded using H.264/AVC are widely used for distributing television program material over various types of networks, including cable, IP TV and satellite using various protocols for encapsulating the NAL units. For example, Internet protocol is used for IP TV whereas the MPEG-2 transport stream (as defined in ISO 13818-1) is used in cable and satellite networks as a robust means for delivering a signal encoded in accordance with H.264/AVC. An MTS that delivers just one program (video and associated audio) is referred to as a single program transport stream (SPTS) whereas an MTS that delivers more than one program is referred to as a multi-program transport stream (MPTS).

In the case of an MTS based distribution system, the network abstraction layer places the NAL units in a video packetized elementary stream (video PES) and supplies the video PES to an MPEG-2 transport stream (MTS) layer. The MTS layer includes a multiplexer that selects the video PES and an associated audio PES, and video and audio PESs of other programs, in the sequence that is required in order to form MPTS packets.

The data bits of the MPTS packets are used to encode a signal for transmission over a channel to a receiver at which the data bits are recovered from the received signal and passed to an MTS layer which parses the bitstream and selects the video PES and audio PES of a desired program and supplies the video PES packets to an AVC decoder and the audio PES packets to an audio decoder. The AVC decoder includes a network abstraction layer that extracts the NAL units from the video PES packets. The AVC decoder calculates a set of transform coefficients from the NAL unit bitstream and processes the transform coefficients and any motion vectors in inverse fashion to the operations in the AVC encoder to create a decoded frame corresponding to the input frame that was presented for encoding. The decoded frame is loaded into a video display buffer. Decoded frames are read from the display buffer at the proper constant rate and are presented for display at the output of the AVC decoder.

The AVC decoder includes a decoder buffer for temporarily storing reference slices so that they will be available for decoding later dependent slices. The nal_ref_idc value allows the AVC decoder to determine readily whether a particular slice should be stored (nal_ref_idc≠0) or may be discarded (nal_ref_idc=0).

It is conventional to organize a sequence of pictures as a GOP, or group of pictures, having a repeating structure of I, P and B pictures. In implementations of the MPEG-2 standard, the GOP may comprise 12 pictures in the sequence IBBPBBPBBPBB (or 15 pictures in the sequence IBBPBBPBBPBBPBB) whereas implementations of H.264/AVC may employ a hierarchical GOP structure in the form IBBBPBBBP etc. or IBBBBBBBPBBBBBBBP etc., depending on whether the decoder stores one or two B pictures. The picture at the beginning of the GOP is sometimes an instantaneous decoding refresh (IDR) picture, or an I or P picture. Accordingly, a GOP is usually self contained: a picture in an earlier GOP usually does not serve as reference for a picture in a later GOP. H.264/AVC does not differentiate among reference slices based on the non-zero value of the nal_ref_idc syntax element. IP based systems sometimes use the three available non-zero values of the nal_ref_idc syntax element to signal a priority level for the NAL units so that IP packets containing NAL units with nal_ref_idc=3 are handled with a higher priority than those containing NAL units with nal_ref_idc values equal to 2 or 1. It has also been proposed that a scalable video coding (SVC) extension of H.264/AVC should employ the non-zero values of the nal_ref_idc syntax element to distinguish among temporal levels of pictures. MTS based applications do not currently use the non-zero values of the nal_ref_idc syntax element to differentiate the handling of NAL units for reference slices.

Many subscribers to cable and satellite television distribution services use PVRs (personal video recorders) to record television program material for later playback and viewing. In this case, the signals are stored in coded form and are played back when desired and decoded in similar manner to the stand alone decoder described above.

In normal operation of the PVR, the video and audio PES packets for a selected program are temporarily saved in a suitable memory device, such as a hard disk drive. When a saved program is selected for viewing by the user, the audio and video PES packets are read from the memory device. The video PES packets are supplied to the AVC decoder and the audio PES packets are supplied to an audio decoder, as described above. The AVC decoder supplies the decoded frames to the video display buffer and the frames are read from the display buffer for presentation to the viewer.

A typical PVR supports various trick playback modes, including fast forward (FF) and rapid reverse (RR), which allow a viewer to scan rapidly through material of little interest. The PVR accomplishes FF and RR playback by discarding pictures of the received sequence, i.e. by omitting pictures of the received sequence from the sequence that is decoded and supplied to the video display buffer. The PVR displays pictures at the normal constant rate (i.e. about 30 frames per second in the United States) but since pictures of the received sequence are discarded, the displayed image evolves at a greater speed than that in normal playback. For example, if the PVR discarded every other picture during FF playback, the displayed image would evolve at twice normal playback speed.

In FF playback, the pictures that are retained in the sequence are presented in the same order as in normal playback. In the case of reverse playback, further manipulation is necessary so that pictures received later in the sequence will be available for presentation before pictures that were received earlier.

In order to minimize degradation of the displayed image during FF or RR playback, it is desirable that the discarded pictures not be reference pictures, since reference pictures are required to decode the dependent slices. This requirement can be applied readily to a signal encoded using MPEG-2 by discarding B pictures, because under MPEG-2, a B picture is not used as a reference picture. If all B pictures in an MPEG-2 sequence employing the standard GOP structure IBBPBB etc. were discarded, the FF or RR speed would be three times normal playback speed. In principle, this approach could be applied to a signal encoded using H.264/AVC, by discarding non-reference B pictures. In this case, no reference slices would be discarded and all dependent slices could be properly decoded. However, in a practical implementation of H.264/AVC the macroblocks in a B slice may refer to as many as five pictures including reference B pictures and therefore there may be relatively few pictures in a given H.264/AVC sequence for which nal_ref_idc=0. Accordingly, in order to achieve FF and RR playback, particularly at speeds from three to six times normal playback speed, it may be necessary to discard reference pictures and the displayed image may accordingly be degraded to an undesirable extent.

SUMMARY OF THE INVENTION

According to a first aspect of the present invention there is provided a method of creating a bitstream in which a sequence of picture slices is encoded as reference slices and non-reference slices, wherein the reference slices include B slices, said method comprising, for each B slice, forming at least one data packet containing data values derived from brightness and color information pertaining to the slice, and for each B slice, including in at least said one data packet a header element indicating whether the B slice is a reference slice, and wherein the header element of each reference B slice has a value that depends on depth of the reference B slice in a hierarchy of discardability.

According to a second aspect of the present invention there is provided apparatus for creating a bitstream in which a sequence of picture slices is encoded as reference slices and non-reference slices, wherein the reference slices include B slices, said apparatus comprising a means for performing a method comprising, for B each slice, forming at least one data packet containing data values derived from brightness and color information pertaining to the slice, and for each B slice, including in at least said one packet a header element reflecting whether the B slice is a reference slice, and wherein the header element of each reference B slice has a value that depends on depth of the reference B slice in a hierarchy of discardability of reference B slices.

According to a third aspect of the present invention there is provided a method of decoding a bitstream conveying a sequence of pictures each containing at least one picture slice, wherein each picture slice is encoded as a reference slice or a non-reference slice, the reference slices include B slices, the bits of each reference B slice are conveyed by at least one data packet that includes a header element having a value that depends on depth of the reference B slice in a hierarchy of discardability, and said method comprises receiving a trick play command calling for pictures to be discarded without being presented, and selecting a picture to be discarded based on the value of the header element.

According to a fourth aspect of the present invention there is provided apparatus for decoding a bitstream conveying a sequence of pictures each containing at least one picture slice, wherein each picture slice is encoded as a reference slice or a non-reference slice, the reference slices include B slices, and the bits of each reference B slice are conveyed by at least one data packet that includes a header element having a value that depends on depth of the reference B slice in a hierarchy of discardability, the apparatus comprising a means for performing a method comprising receiving a trick play command calling for pictures to be discarded without being presented, selecting a reference B picture to be discarded based on the value of the header element.

According to a fifth aspect of the present invention there is provided a computer readable medium containing instructions that, when executed by a computing machine receiving a bitstream in which a sequence of picture slices is encoded as reference slices and non-reference slices, wherein the reference slices include B slices, cause the computing machine to perform a method comprising, for each B slice, forming at least one data packet containing data values derived from brightness and color information pertaining to the slice, and for each B slice, including in at least said one data packet a header element indicating whether the B slice is a reference slice, and wherein the header element of each reference B slice has a value that depends on depth of the reference B slice in a hierarchy of discardability.

According to a sixth aspect of the present invention there is provided a method of assisting in trick play operation of a video recording and playback device, comprising, at a transmitting location, encoding a sequence of pictures, each containing at least one picture slice, selectively in either a normal mode or a trick play assist mode, and in the trick play assist mode, encoding each slice as one of at least two different types depending on prediction needed to decode the slice, for each slice of at least one type, forming at least one data packet containing data values derived from image information pertaining to the slice, creating at least one data value for each slice of said one type that indicates depth of the picture containing the slice in a hierarchy of discardability, encapsulating the data packets in a transport stream with the created data values, and transmitting the transport stream to a receiving location, at the receiving location, extracting the data packets from the transport stream and temporarily storing the data packets for later playback in normal operation or trick play operation, and in trick play operation, detecting whether the sequence of picture slices was encoded in the trick play assist mode and, if so, selectively discarding pictures depending on said data values.

According to a seventh aspect of the present invention there is provided a method of creating a bitstream in which a sequence of picture slices is encoded as slices of at least two different types depending on prediction needed to decode the slice, said method comprising, for each slice of at least one type, forming at least one data packet containing data values derived from brightness and color information pertaining to the slice, and for a slice of said one type, including in at least said one data packet a header element indicating whether the slice is a reference slice, and wherein in the event that said slice is a reference slice the header element has a value that depends on depth of the reference slice in a hierarchy of discardability.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
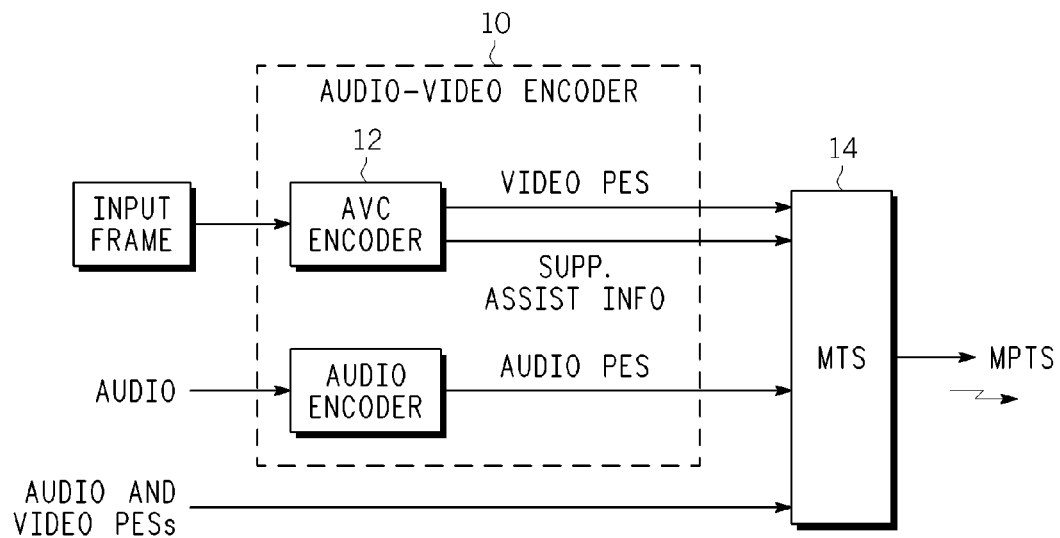
FIG. 1 is a block schematic diagram of an audio-video encoder embodying the present invention.

H.264/AVC does not restrict the type (I, P or B) of pictures to which a B picture may refer. Since a B picture may serve as reference for another B picture, and the latter B picture may serve as reference for a further B picture, we may describe a hierarchy of dependent pictures, i.e. pictures that may rely on one or more reference pictures for decoding, in ascending order of importance:

1. I pictures.
2. P pictures.
3. Reference B pictures that use only I and/or P pictures as reference pictures.
4. Reference B pictures that use B pictures in level 3 of the hierarchy (and may also use I and/or P pictures) as reference pictures.
5. Reference B pictures that use B pictures in level 4 of the hierarchy (and may also use I and/or P pictures and B pictures in level 3) as reference pictures.
6. Non-reference B pictures.

In this hierarchy of importance, 1 is the highest level (most important) and 6 is the lowest level (least important). The higher a picture's level in the hierarchy of importance, the more important is it to successful decoding. Thus, if a B picture at a lower level in the hierarchy were discarded, the playback image would be less seriously degraded than if a B picture at a higher level in the hierarchy were discarded.

We may use this hierarchy of importance of dependent pictures to establish rules of priority that may be used by a PVR for determining pictures that should be discarded in trick modes to achieve different trick mode playback rates. For example:

First level of discardability: non-reference B pictures (level 6 in hierarchy of importance).

Second level of discardability: non-reference B pictures plus reference B pictures in level 5.

Third level of discardability: non-reference B pictures plus reference B pictures in levels 5 and 4.

Fourth level of discardability: non-reference B pictures plus reference B pictures in levels 5, 4 and 3.

Fifth level of discardability: some P pictures plus all B pictures.

Sixth level of discardability: some I pictures plus some P pictures and all B pictures.

It will be appreciated that at each succeeding level of discardability, from the first (or highest) level to the sixth (or lowest) level, a greater number of pictures is discarded and accordingly a higher playback rate is achieved.

If a viewer's command calls for a 3× playback rate, such that two thirds of the pictures must be discarded, it will typically be necessary to discard all the pictures in the first through fourth levels, whereas if the command calls for a 2× rate, it might only be necessary to discard the pictures in the first and second levels.

FIG. 1 illustrates an audio-video encoder 10 that may be located at the premises of a television programming service provider, such as a cable operator. The encoder 10 includes an AVC encoder 12 having two distinct modes of operation. Thus, the AVC encoder may operate in the conventional manner in which dependent pictures are encoded without regard to discardability of the pictures but it may alternatively operate having regard to discardability of pictures in order to assist trick play operation of a PVR that receives the encoded pictures.

The AVC encoder 12 receives frames and encodes the frames using H.264/AVC based on a GOP structure. It will be recalled from the definition of an AVC hierarchial GOP that in each set of pictures in a GOP, the first picture is an I or P picture and the subsequent pictures are B pictures, with the number of B pictures depending on the hierarchy. For each dependent picture within a GOP, the AVC encoder 12 determines which pictures to use as reference for encoding the current picture based on the importance of dependent pictures that have already been encoded. The encoder limits the reference B pictures to three levels of importance and requires that a picture in a given level of importance not be used to create a picture at a higher level of importance. For example, the encoder may use a B picture in level 3 to create a picture in level 4 but may not use a B picture in level 3 to create a picture in level 2 or level 1, and the encoder may not use a B picture to create a P picture.

The AVC encoder assigns a nal_ref_idc value to a reference B picture based on the importance of the picture and enters the assigned nal_ref_idc value in the nal_ref_idc syntax element of the (or each) NAL unit of the picture. Preferably, nal_ref_idc=1 is assigned to reference B pictures in level 4, nal_ref_idc=2 is assigned to reference B pictures in level 3, and nal_ref_idc=3 is assigned to reference B pictures in level 2. B pictures with nal_ref_idc=2 are not used as reference pictures for predicting B pictures for which nal_ref_idc=3, and B pictures with nal_ref_idc=1 are not used for predicting B pictures for which nal_ref_idc=3 or 2. However, a B picture with nal_ref_idc=1 may be used for predicting a non-reference B picture. Then, the priority of discardability rules can be expressed:

First level of discardability: B pictures for which nal_ref_idc=0.

Second level of discardability: B pictures for which nal_ref_idc=0 or 1.

Third level of discardability: B pictures for which nal_ref_idc=0, 1 or 2.

Fourth level of discardability: all B pictures.

Fifth level of discardability: some P pictures plus all B pictures.

Sixth level of discardability: some I pictures plus some P pictures and all B pictures.

The encoded bits are passed to the network abstraction layer to form the NAL units, the NAL units are placed in the video PES, and the video PES packets are passed to the MTS layer 14.

The AVC encoder also generates supplementary assist information that indicates whether the AVC encoder is operating in the conventional mode or in the trick play assist mode and provides this assist information, which may be a single bit, to the MTS layer. The MTS layer places the assist information as a descriptor (for example as an extension to the adaptation_field_data descriptor specified in DVB_SI) in the MPEG-2 multiplex.

Figure 2:
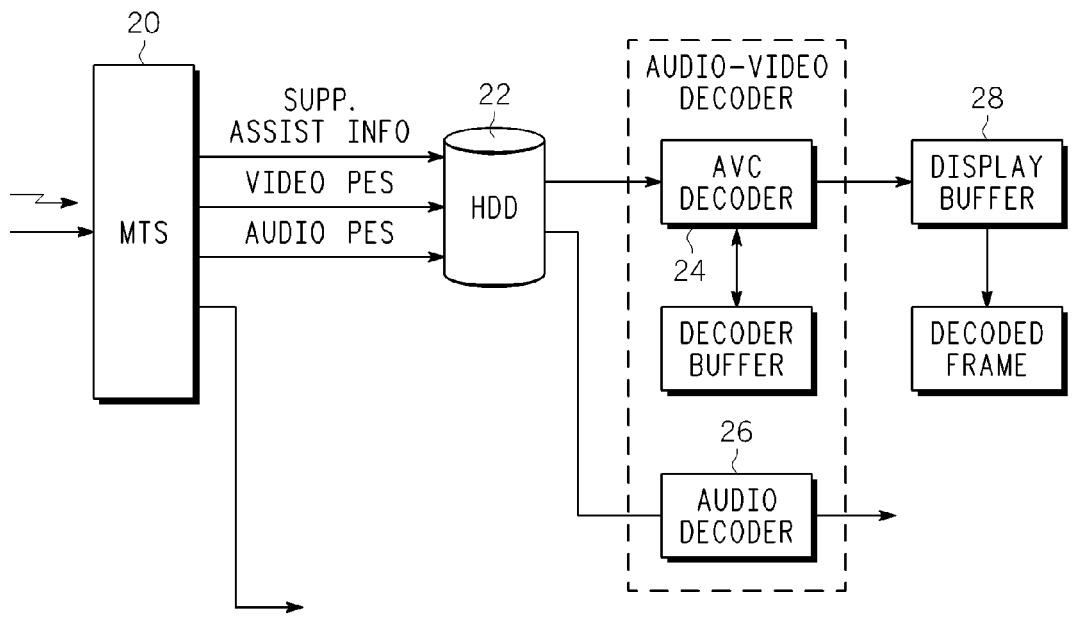
FIG. 2 is flow chart illustrating a first personal video recorder embodying the present invention.

FIG. 2 illustrates a PVR that may be located at a customer premise. The PVR receives the MPTS containing the coded pictures and associated coded audio, and the assist information, and the MTS layer 20 supplies the video and audio PES packets (and assist information) for a selected program to a memory device 22, such as a hard disk drive, which stores the packets and assist information until the viewer selects the program for viewing. The video and audio PES packets and the assist information are then read from the memory device and the video PES packets and assist information are supplied to an AVC decoder 24 whereas the audio PES packets are supplied to an audio decoder 26. The AVC decoder extracts the NAL units from the video PES packets. At normal playback speed, the AVC decoder operates in inverse fashion to the AVC encoder and creates decoded frames that are loaded into a display buffer, as described above, and are subsequently read from the display buffer at the proper constant rate and are presented to the viewer.

In trick play mode, the AVC decoder receives a message indicating the playback rate requested by the viewer. The AVC decoder checks whether the assist information indicates that the program has been encoded using the trick play assist mode and, if so, parses the bitstream in order to recover the NAL units and extract the respective nal_ref_idc values and uses the nal_ref_idc values of the B pictures to select the pictures to discard. The AVC decoder discards sufficient pictures, starting with the highest level of discardability, that when the remaining pictures are presented at the same constant rate the requested playback rate is achieved. For example, the AVC decoder may create a table for the current GOP containing the number of B pictures for each value of nal_ref_idc, determine the highest level of discardability that will result in the proper number of pictures being discarded, and discard the pictures that meet this level of discardability. In this manner, at a given playback rate the pictures that are discarded are not needed to decode the pictures that are retained and accordingly degradation of the displayed image is minimized. Thus, the non-zero values of the nal_ref_idc syntax element allow the video decoder to make a more intelligent decision regarding which pictures to omit from the sequence loaded into the display buffer.

Figure 3:
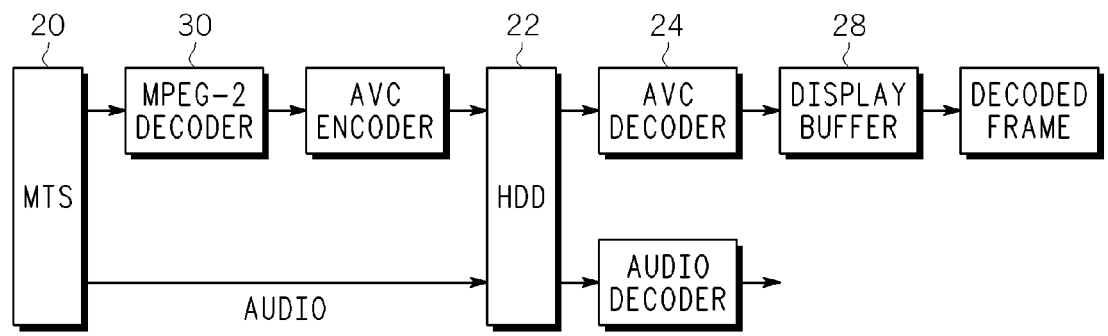
FIG. 3 is a block schematic diagram of a second personal video recorder embodying the present invention.

The subject matter disclosed in this application is not restricted to the case in which the encoding in H.264/AVC takes place at the premises of the television programming service provider. For example, the programming services provider may transmit video that has been encoded in MPEG-2 and the PVR may transcode the MPEG-2 video to H.264/AVC for storing because of the superior compression offered by H.264/AVC. Thus, referring to FIG. 3, the MPEG-2 video data is decoded by an MPEG-2 decoder 30 and then encoded to H.264/AVC. The H.264/AVC encoder 32 operates in essentially the manner described with reference to FIG. 1, except that the MTS layer (not shown in FIG. 3) produces a single program transport stream that is not transmitted over a channel but is stored in the memory device 22. Upon playback, the PVR operates in the manner described with reference to FIG. 2.

Figure 4:
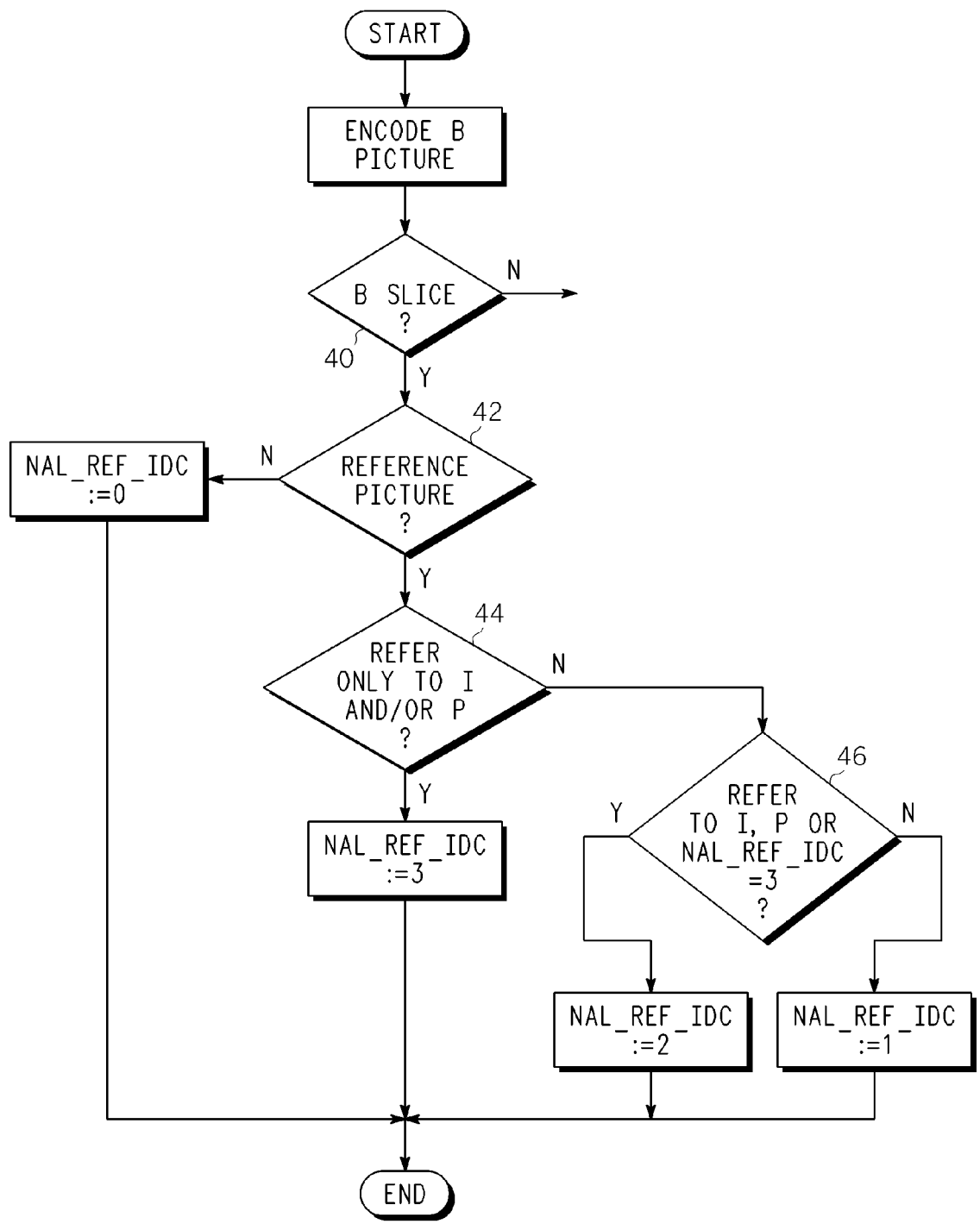
FIG. 4 is a flow chart illustrating a decision tree that may be executed by an AVG encoder included in the audio-video encoder illustrated in FIG. 1.

The encoder described with reference to FIG. 1 makes a decision regarding the level of importance of a dependent picture based on the pictures that have already been encoded and are available as reference pictures. In another encoder, which is topologically the same as that shown in FIG. 1, the encoder determines the importance of a B picture after encoding and assigns a value of nal_ref_idc accordingly. In this case, the AVC encoder 12 identifies the type of each slice in the picture based on the slice_type syntax element of the slices and identifies the pictures that the slice refers to based on the reference picture list in the slice header. The encoder 12 creates a table that contains, for each B picture, an entry that identifies each picture referred to by the slices in the picture. Referring to FIG. 4, for each B slice in the B picture (selected by decision 40), the encoder assigns a value to the syntax element nal_ref_idc based on the entries in the table. For example, the AVC encoder first determines (decision 42) whether the picture that contains the slice is a reference picture. If the picture is not a reference picture, i.e. the picture is not referred to in the reference picture list for any slice of any other picture in the GOP, the video encoder sets nal_ref_idc=0 for each slice in the picture, consistently with H.264/AVC. If the picture that contains the slice is a reference picture, the encoder then determines (decision 44) whether the picture refers only to I or P pictures and, if so sets nal_ref_idc=3. In similar fashion, as shown in FIG. 4, the encoder sets nal_ref_idc=2 if the picture that contains the slice refers only to an I or P picture and a picture for which nal_ref_idc=3 and otherwise sets nal_ref_idc=1 (decision 46).

In the case of the embodiments described in connection with FIGS. 1 and 2 the video PES packets are conveyed to the PVR in an MPEG-2 transport stream. It will be understood by those skilled in the art that MPEG-2 transport stream packets are of fixed length, each 188 bytes long and having a four byte header. Accordingly, when H.264/AVC NAL units are encapsulated in MTS packets, each NAL unit is spread over numerous MTS packets and in order to identify the beginning of a new NAL unit and the end of a previous NAL unit in the MPTS packets, each NAL unit is preceded by a start code prefix of three bytes; emulation of a start code prefix within a NAL unit is prevented by including emulation prevention bytes in the NAL unit byte stream. However, the invention may also be applied to IPTV, in which the AVC NAL units are conveyed in IP packets. IP packets are of variable length and a single IP packet may encapsulate a complete NAL unit, and it is not necessary to include a start code prefix or emulation prevention bytes.

Figure 5:
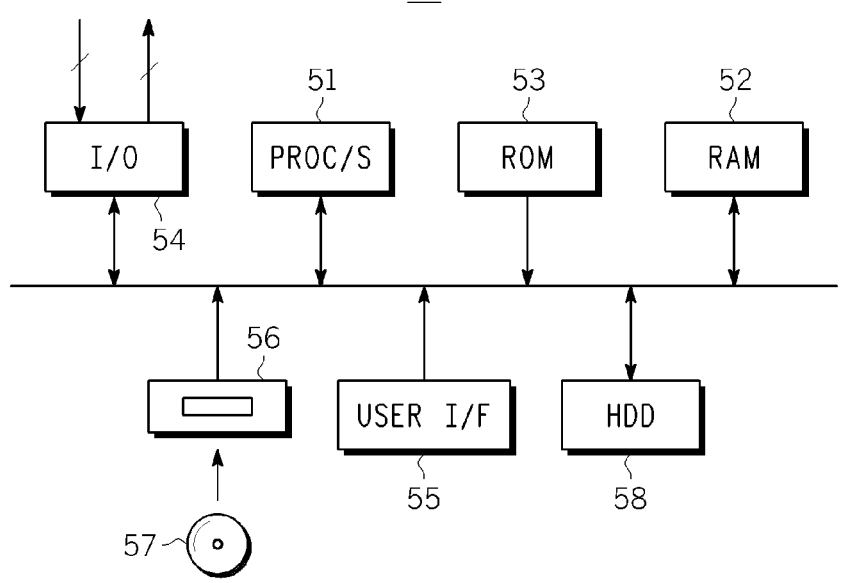
FIG. 5 is a block schematic diagram of a computing machine that may be used to implement parts of the AVC encoder.

Referring to FIG. 5, suitable television programming service provider premise equipment may be implemented using a computer 50 comprising one or more processors 51, random access memory 52, read-only memory 53, I/O devices 54, a user interface 55 and a hard disk drive 58, configured in a generally conventional architecture. The computer operates in accordance with a program that is stored in a computer readable medium, such as the hard disk drive 58 or a CD-ROM 57, and is loaded into the random access memory 52 for execution. The program is composed of instructions such that when the computer receives a bitstream representing a sequence of picture slices encoded as reference slices and non-reference slices, by way of a suitable interface included in the I/O devices 54, the computer allocates memory to appropriate buffers and utilizes other suitable resources and functions to perform the various operations that are described above as being performed by the encoder.

It will be appreciated by those skilled in the art that the program might not be loadable directly from the CD-ROM 57 into the random access memory utilizing the CD-ROM drive 56 and that generally the program will be stored on the CD-ROM or other distribution medium in a form that requires the program to installed on the hard disk drive 58 from the CD-ROM 57.

The subject matter described with reference to FIGS. 1 and 2 is not limited to the case in which the AVC encoder has two modes of operation. The AVC encoder may be operated at all times in the trick play assist mode, in which case there is no need to include the assist information in the MTS multiplex because the AVC decoder always operates in the manner described with reference to FIG. 2.

In some implementations of H.264/AVC the sequence of pictures is composed only of I pictures and P pictures, i.e. there are no B pictures. In this case, non-zero values of nal_ref_idc may be used to facilitate decisions regarding discarding of P pictures in trick play mode of a PVR.

In addition, the subject matter disclosed in this application is not restricted to use of the non-zero nal_ref_idc values to facilitate decision making over pictures to discard in trick playback mode of a PVR. For example, the non-zero values may be encoded to signal other information to facilitate operation of a PVR.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of creating a bitstream in which a sequence of picture slices is encoded as reference slices and non-reference slices, wherein the reference slices include a plurality of B slices, said method comprising:
   for each B slice, forming at least one data packet containing data values derived from brightness and color information pertaining to the slice, and
   for each B slice, including in the at least one data packet a header element indicating whether a B slice is a reference slice,
   said header element containing a value that indicates where in a hierarchy of discardability the B slice is,
   said hierarchy of discardability comprising a ranking of the plurality of B slices by how much degradation to the sequence of picture slices will be experienced by a discarding of each B slice.

2. The method according to claim 1, wherein, for a picture that includes at least two reference B slices, the method comprises setting the header element of each reference B slice to the same value.

3. The method according to claim 2, further comprising decoding the bitstream and selectively discarding pictures that contain reference B slices in accordance with the value of the header element of the or each reference B slice.

4. The method according to claim 1, comprising encoding a sequence of pictures each containing at least one picture slice, including each reference B slice in a reference B picture, and setting the header elements of all reference B slices in a given reference B picture to the same value.

5. The method according to claim 1, comprising encoding a sequence of pictures each containing at least one picture slice, including each reference B slice in a reference B picture, and limiting reference B pictures to three levels of importance.

6. The method according to claim 5, comprising encoding the reference B pictures in a manner such that a reference B picture at a lower level of importance is not used as reference for a reference B picture at a higher level of importance and is not used as reference for a P picture.

7. The method according to claim 1, wherein the header element is a two-bit syntax element and the method comprises:
    assigning a first value to the syntax element in the event that the B slice is a non-reference slice,
    assigning a second value to the syntax element in the event that the B slice is a reference slice and is a slice of a picture having a first level of discardability in a hierarchy of discardability of reference B pictures,
    assigning a third value to the syntax element in the event that the B slice is a reference slice and is a slice of a picture having a second level of discardability in a hierarchy of discardability of reference B pictures, and
    assigning a fourth value to the syntax element in the event that the B slice is a reference slice and is a slice of a picture having a third level of discardability in a hierarchy of discardability of reference B pictures,
    said hierarchy of discardability comprising a ranking of the plurality of B slices by how much degradation to the sequence of picture slices will be experienced by a discarding of each B slice.

8. Apparatus for creating a bitstream in which a sequence of picture slices is encoded as reference slices and non-reference slices, wherein the reference slices include a plurality of B slices, said apparatus comprising a means for performing a method comprising:
    for B each slice, forming at least one data packet containing data values derived from brightness and color information pertaining to the slice, and
    for each B slice, including in the at least one packet a header element reflecting whether the B slice is a reference slice,
    said header element containing a value that indicates where in a hierarchy of discardability the B slice is,
    said hierarchy of discardability comprising a ranking of the plurality of B slices by how much degradation to the sequence of picture slices will be experienced by a discarding of each B slice.

9. A method of decoding a bitstream conveying a sequence of pictures each containing at least one picture slice, wherein each picture slice is encoded as a reference slice or a non-reference slice, the reference slices include a plurality of B slices, bits of each reference B slice are conveyed by at least one data packet that includes a header element having a value, and said method comprises:
    receiving a trick play command calling for pictures to be discarded without being presented, and selecting, using an advanced video coding (AVC) decoder, a picture to be discarded based on the value of the header element
    said value indicating where in a hierarchy of discardability a B slice is,
    said hierarchy of discardability comprising a ranking of the plurality of B slices by how much degradation to the sequence of picture slices will be experienced by a discarding of each B slice.

10. The method according to claim 9, wherein the header element is a two-bit syntax element.

11. Apparatus for decoding a bitstream conveying a sequence of pictures each containing at least one picture slice, wherein each picture slice is encoded as a reference slice or a non-reference slice, the reference slices include B slices, and bits of each reference B slice are conveyed by at least one data packet that includes a header element having a value, the apparatus comprising a means for performing a method comprising:
    receiving a trick play command calling for pictures to be discarded without being presented,
    selecting a reference B picture to be discarded based on the value of the header element,
    said value indicating where in a hierarchy of discardability a B slice is,
    said hierarchy of discardability comprising a ranking of the B slices by how much degradation to the sequence of picture slices will be experienced by a discarding of each B slice.

12. A non-transitory computer readable medium containing instructions that, when executed by a computing machine receiving a bitstream in which a sequence of picture slices is encoded as reference slices and non-reference slices, wherein the reference slices include a plurality of B slices, cause the computing machine to perform a method comprising:
    for each B slice, forming at least one data packet containing data values derived from brightness and color information pertaining to the slice, and
    for each B slice, including in the at least one data packet a header element indicating whether the B slice is a reference slice,
    said value indicating where in a hierarchy of discardability a B slice is,
    said hierarchy of discardability comprising a ranking of the plurality of B slices by how much degradation to the sequence of picture slices will be experienced by a discarding of each B slice.

13. A method of assisting in trick play operation of a video recording and playback device, comprising:
    at a transmitting location,
    encoding, using an advanced video coding (AVC) encoder, a sequence of pictures, each containing at least one picture slice, selectively in either a normal mode or a trick play assist mode, and
    in the trick play assist mode, encoding each slice as one of at least two different types depending on prediction needed to decode the slice, for each slice of at least one type, forming at least one data packet containing data values derived from image information pertaining to the slice, creating at least one data value for each slice of said one type,
    said value indicating where in a hierarchy of discardability the B slice is,
    said hierarchy of discardability comprising a ranking of the B slices by how much degradation to the sequence of picture slices will be experienced by a discarding of each B slice,
    at the receiving location,
    extracting data packets from the transport stream and temporarily storing the data packets for later playback in normal operation or trick play operation, and in trick play operation, detecting, using an advanced video coding (AVC) decoder, whether the sequence of picture slices was encoded in the trick play assist mode and, if so, selectively discarding pictures depending on said data values.

14. The method according to claim 13, comprising encapsulating the data packets in an MPEG transport stream wherein a descriptor indicates whether the sequence of pictures has been encoded in the trick play assist mode.

15. The method according to claim 13, comprising, in the trick play assist mode, generating supplementary assist information that indicates that the sequence of pictures has been encoded in the trick play assist mode and communicated the trick play assist information to the receiving location.

16. The method according to claim 13, wherein each slice is either an I slice, a P slice or a B slice, each B slice is a reference B slice or a non-reference B slice, each reference B slice is included in a reference B picture, each reference B picture has one of three levels of importance, and the method comprises encoding the reference B pictures in a manner such that a reference B picture at a lower level of importance is not used as reference for a reference B picture at a higher level of importance and is not used as reference for a P picture.

17. A method of creating a bitstream in which a sequence of picture slices is encoded as slices of at least two different types depending on prediction needed to decode the slice, said method comprising:

for each slice of at least one type, forming at least one data packet containing data values derived from brightness and color information pertaining to the slice, and for a slice of said one type, including in the at least one data packet a header element indicating whether the slice is a reference slice, and wherein in the event that said slice is a reference slice the header element has a value, said value indicating where in a hierarchy of discardability the reference slice is, said hierarchy of discardability comprising a ranking of the reference slices of the sequence by how much degradation to the sequence of picture slices will be experienced by a discarding of each B slice.

18. The method according to claim 17, wherein the slices of said one type are B slices.

19. The method according to claim 17, comprising encoding a sequence of pictures as intra-coded pictures and predictive coded pictures, wherein the predictive coded pictures include reference pictures, and the method includes limiting reference pictures of at least one type of predictive coded picture to three levels of importance.

* * * * *